United States Patent [19]

Kinashi et al.

[11] Patent Number: 5,144,621
[45] Date of Patent: Sep. 1, 1992

[54] COMMON BUS COMMUNICATION SYSTEM WITH REDUCED INTERFACE MEMORIES

[75] Inventors: Haruhiko Kinashi, Tokyo; Toshiyuki Watanabe, Yamagata, both of Japan

[73] Assignee: NEC Corporation, Tokyo, Japan

[21] Appl. No.: 766,178

[22] Filed: Sep. 27, 1991

[30] Foreign Application Priority Data

Sep. 28, 1990 [JP] Japan .................. 2-261928

[51] Int. Cl.⁵ ........................... H04J 3/02; H04J 3/08
[52] U.S. Cl. ................................. 370/85.1; 370/85.2
[58] Field of Search ............... 370/85.1, 85.13, 85.14, 370/85.2, 85.3, 85.4, 85.5, 94.1, 60

[56] References Cited

U.S. PATENT DOCUMENTS 4,366,479 12/1982 Mori et al. ................ 370/85.15 X
4,536,873 8/1985 Leete .......................... 370/85.1

Primary Examiner—Douglas W. Olms
Assistant Examiner—Russell Blum
Attorney, Agent, or Firm—Foley & Lardner

[57] ABSTRACT

In a common bus communication system in which multiple bus interfaces (2) are connected to the common bus, each bus interface comprises a main memory (21) and an auxiliary memory (28, 29). When a packet destined to the own interface is detected by an address detector (22), memory control data is stored into the auxiliary memory in a location corresponding to a destination user terminal ($5_i$) as well as to the location of the packet in the main memory. When a read request is received from the destination user terminal, control data is fetched from the auxiliary memory and a packet in the data memory is accessed according to the fetched control data, and a copy of the accessed packet is sent to the destination user terminal, and following the transmission the control data is updated. Packets propagating along the common bus are stored into the main memory according to the updated control data.

3 Claims, 5 Drawing Sheets

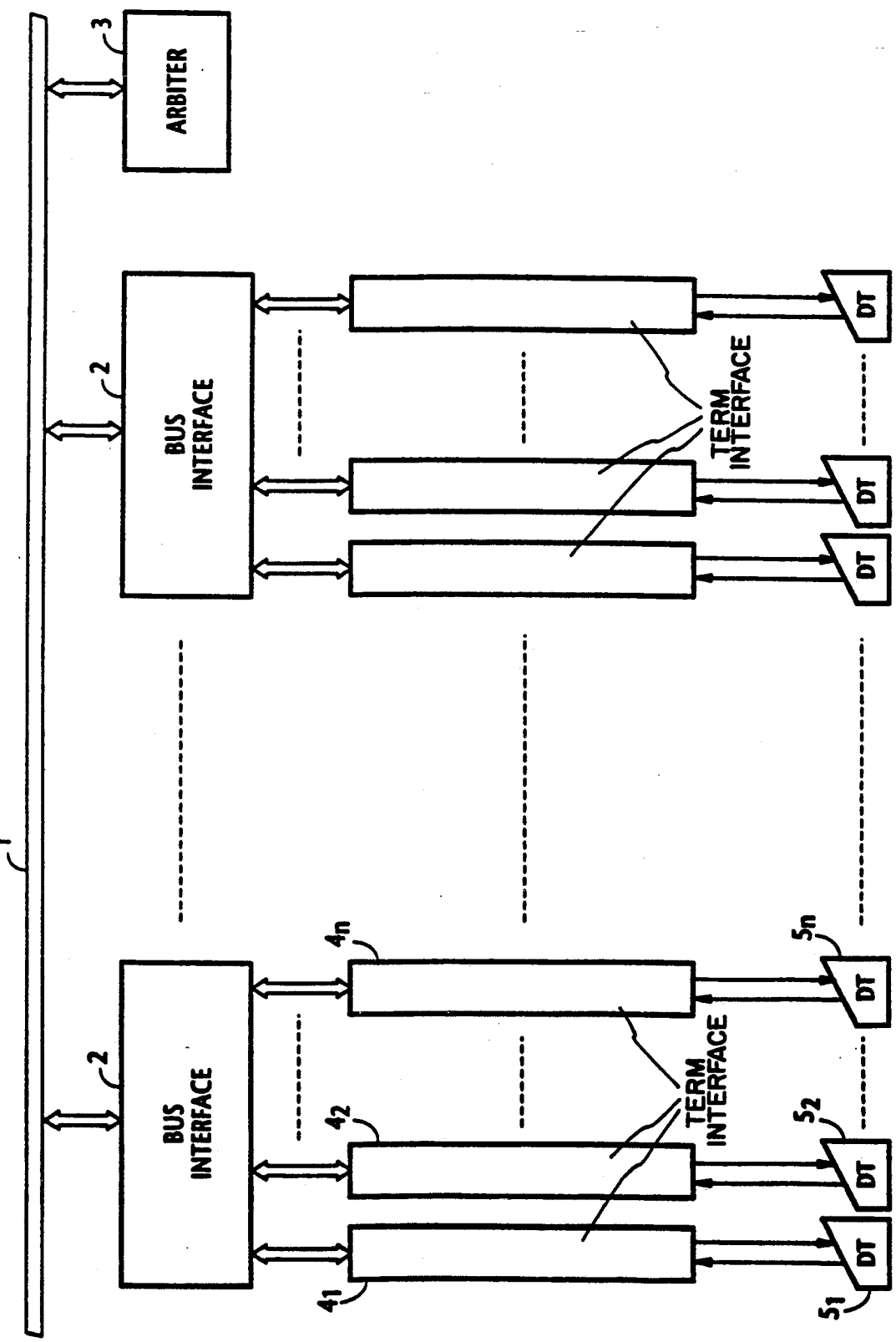

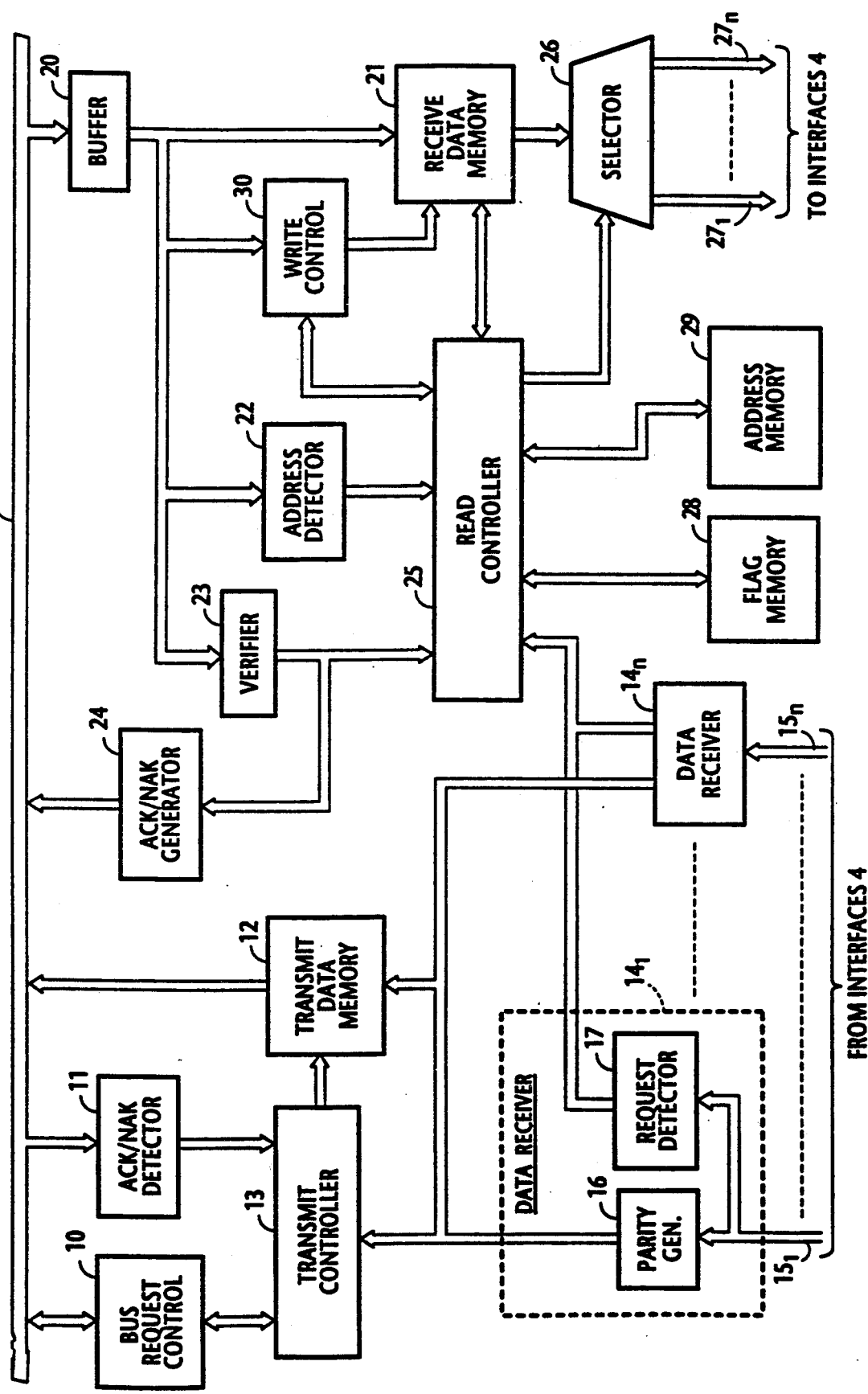

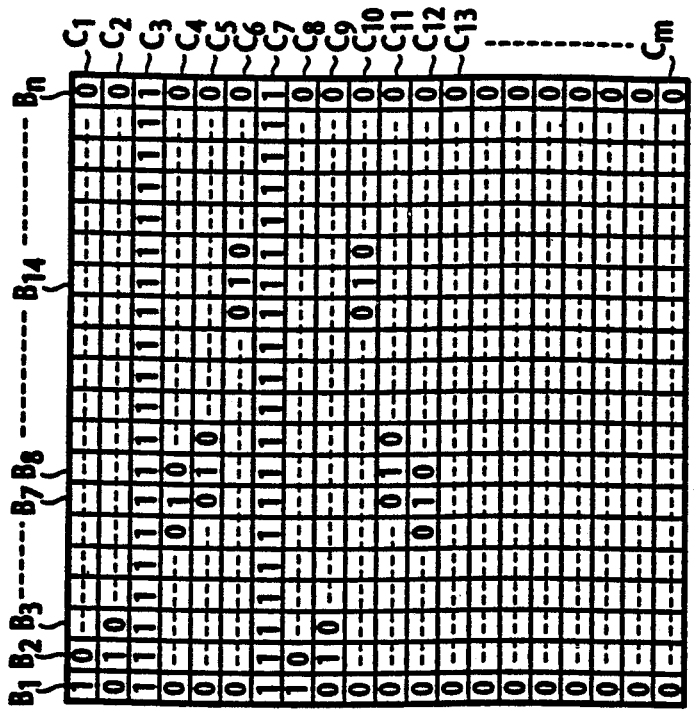
FIG. 3A
RECEIVE DATA MEMORY 21
FIG. 3B
FLAG MEMORY 28
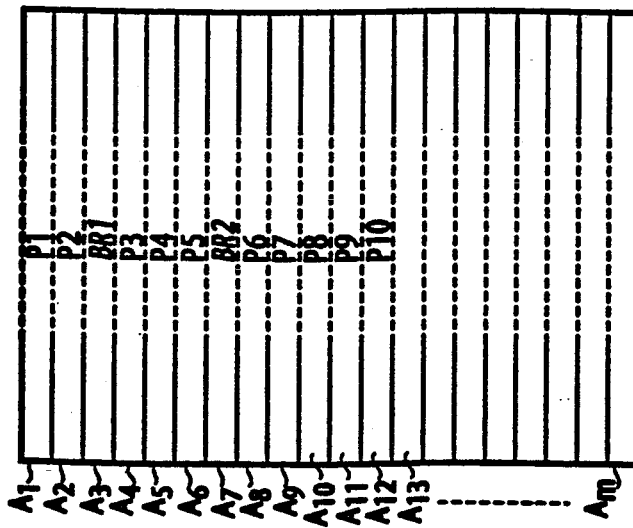
FIG. 3C
ADDRESS MEMORY 29

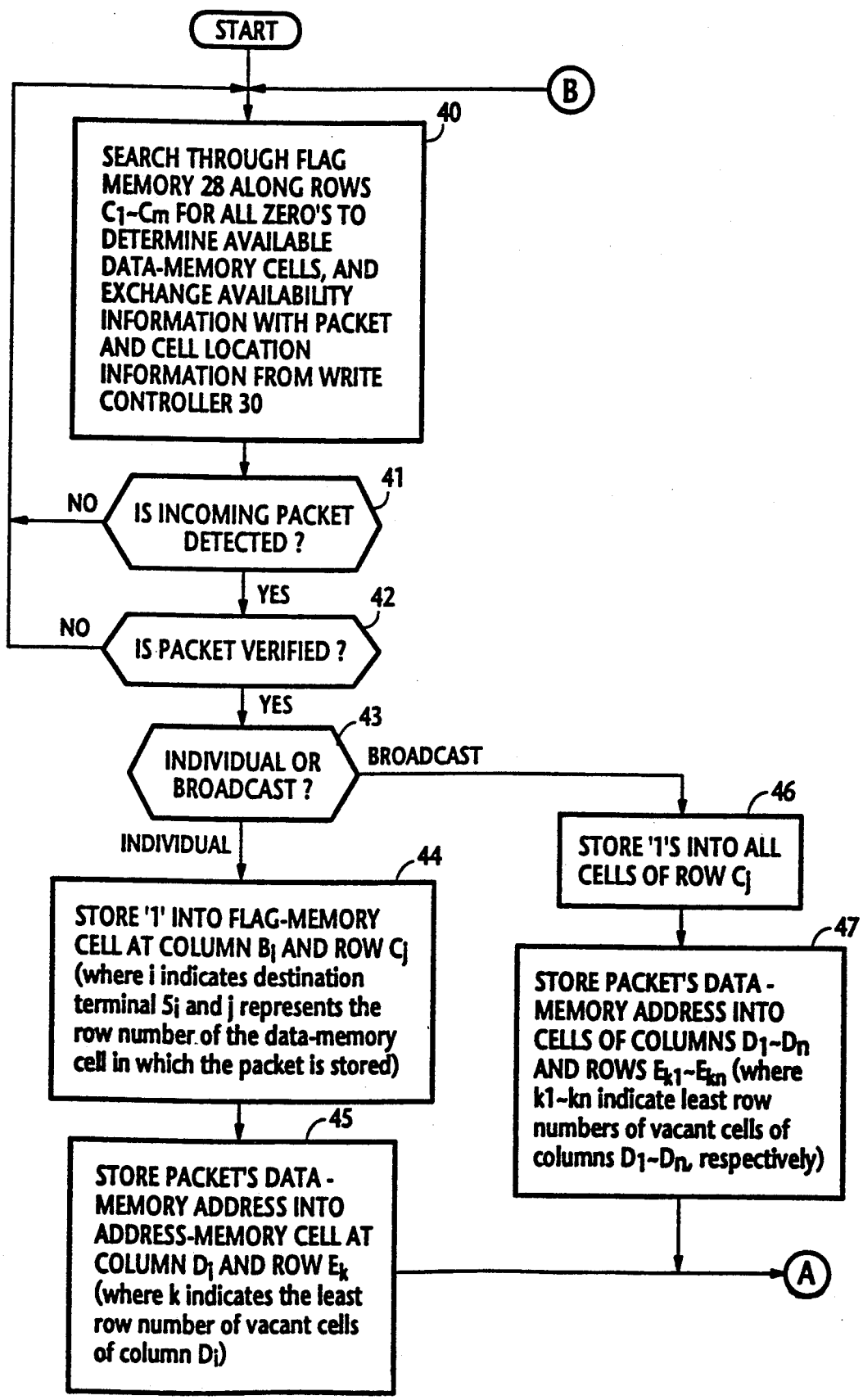

COMMON BUS COMMUNICATION SYSTEM WITH REDUCED INTERFACE MEMORIES

BACKGROUND OF THE INVENTION

The present invention relates generally to common bus communication systems, and more specifically to bus interfaces of the system.

With a current common bus communication system in which bus interfaces are connected to a common bus, each bus interface is provided FIFO (first-in-first-out) memories corresponding respectively to the user terminals associated with the bus interface. Packets received from the associated user terminals are forwarded from each interface onto the common bus. Upon arrival at each interface, the packets are passed through an address filter and stored respectively into the FIFO memories according to their destinations. On receiving a read request from one of the associated user terminals, the interface accesses the associated FIFO memory to fetch the stored packets therefrom. One shortcoming of the prior art memory configuration is that since the FIFO memories are needed to store as many packets as there are packets to transmit, the storage capacity of the memories would impractically increase if packets of "broadcast" type are handled by the system.

SUMMARY OF THE INVENTION

It is therefore an object of the present invention to provide a common bus communication system which allows packets to be broadcast to all user terminals without increasing the memories of each interface.

According to a broader aspect of this invention, there is provided a communication system for serving a plurality of groups of user terminals. The system comprises a common bus for carrying packets and a plurality of bus interfaces connected to the common bus, the bus interfaces being associated respectively with the groups of user terminals, each of the bus interfaces forwarding a packet received from one of the user terminals of the associated group onto the common bus and receiving a packet therefrom. Each bus interface comprises a main memory, an auxiliary memory, and an address detector for detecting a packet destined to at least one of the user terminals of the associated group from packets stored in the data memory. A controller is responsive to the determination by the address detector for storing control data into the auxiliary memory in a location corresponding to a destination user terminal as well as to the location of the detected packet in the main memory. The controller is further responsive to a request from the destination user terminal for fetching control data from the auxiliary memory. A packet in the main memory is accessed according to the fetched control data, and a copy of the accessed packet is transmitted to the destination user terminal. Following the transmission of the packet copy, the control data is updated. According to the updated control data, packets from the common bus are stored into the main memory.

In a specific aspect of this invention, each bus interface comprises a data memory having a plurality of cells, a flag memory having an array of cells arranged in columns corresponding respectively to the user terminals of the associated group and in rows corresponding respectively to the cells of the data memory, and an address memory having an array of cells arranged in columns and rows, the columns corresponding respectively to the user terminals of the associated group. An address detector is provided for detecting a packet destined to at least one of the user terminals of the associated group from packets stored in the data memory. The controller responds to the output of the address detector by writing a flag bit into a cell of the flag memory corresponding to a destination user terminal as well as to a cell of the data memory in which the detected packet is stored and further writing address data into a cell of the address memory corresponding to the destination user terminal. The controller is further responsive to a read request from one of the associated user terminals for fetching address data from a cell corresponding to the requesting user terminal, and accessing a packet in the data memory according to the fetched address data. A copy of the accessed packet is transmitted to the requesting user terminal and a flag bit is erased in a cell corresponding to the data memory cell in which the accessed packet is stored. Packets travelling along the common bus are stored into cells of the data memory corresponding to the rows of the flag memory in which no flag bits are stored.

According to a further aspect of this invention, the controller determines if a packet detected by the address detector is an individual packet having a single destination user terminal or a broadcast packet having multiple destination user terminals. If a packet is determined to be an individual packet, a flag bit is stored into a cell of the flag memory corresponding to the destination of the packet and corresponding to a cell of the data memory in which the detected packet is stored, and address data is stored into a cell of the address memory corresponding to the destination of the packet. If a packet is determined to be a broadcast packet, flag bits are stored into cells of the flag memory corresponding to the multiple destinations of the packet and corresponding to a cell of the data memory in which the packet is stored, and address data are stored into cells of the address memory corresponding to the multiple destination user terminals.

BRIEF DESCRIPTION OF THE DRAWINGS

The present invention will be described in further detail with reference to the accompanying drawings, in which:

FIG. 1 is a block diagram of a common bus communication system of the present invention;

FIG. 2 is a block diagram of each bus interface of FIG. 1;

FIGS. 3A, 3B and 3C are illustrations of the memories of FIG. 1; and

FIGS. 4A and 4B are flowcharts of programmed instructions performed by the read controller of FIG. 1.

DETAILED DESCRIPTION

Figure 4B:
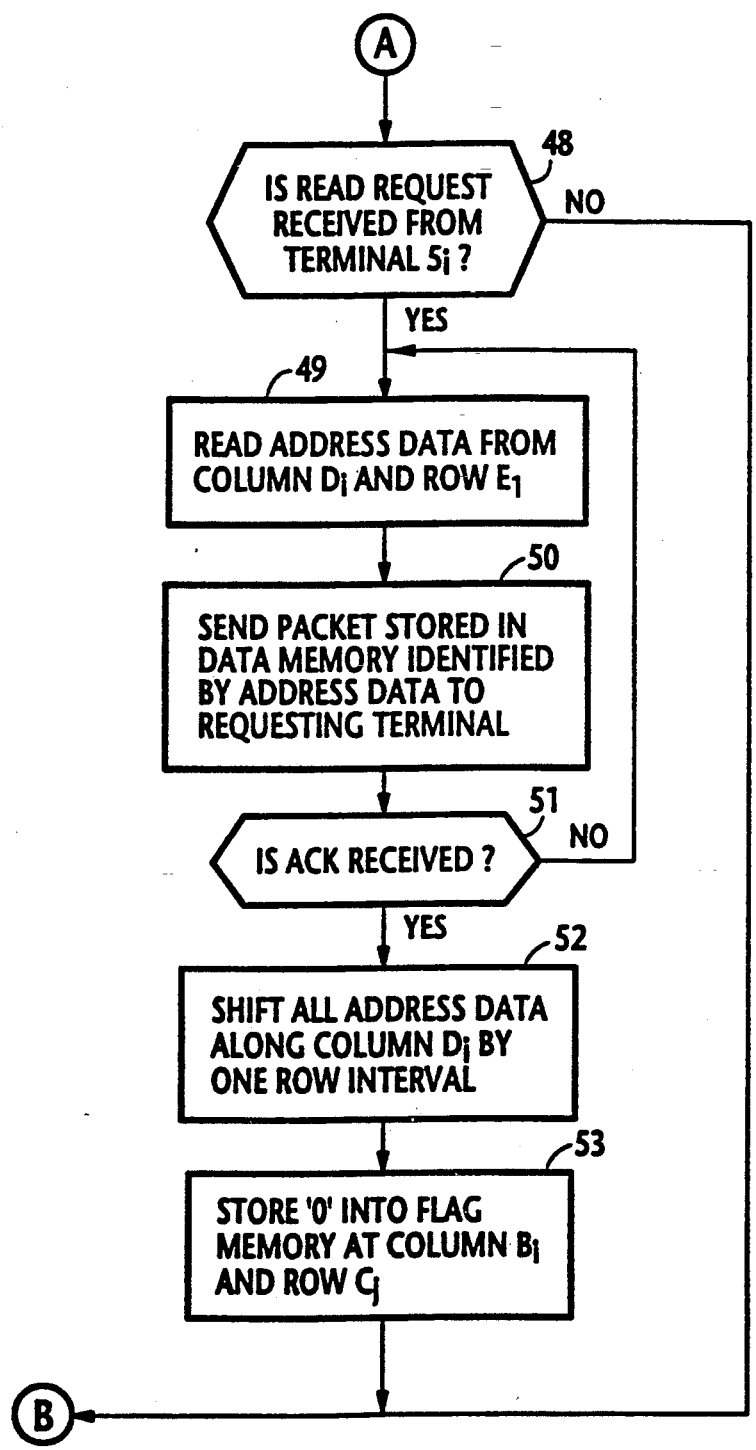

Referring now to FIG. 1, there is shown a common bus communication system embodying the present invention. The system comprises a common bus 1 to which a plurality of bus interfaces 2 and a bus arbiter 3 are connected. Each of bus interfaces 2 is connected to terminal interfaces $4_1$–$4_n$ to which user's data terminals $5_1$–$5_n$ are respectively coupled.

As illustrated in FIG. 2, in each bus interface 2, a bus request controller 10, a positive/negative acknowledgment (ACK/NAK) detector 11 and a transmit data memory 12 are coupled to the common bus 1 and a transmit controller 13 is associated with bus request controller 10, ACK/NAK detector 11 and transmit data memory 12. Associated respectively with data terminals $5_1$-$5_n$ through buses $15_1$-$15_n$ are the data receivers $14_1$-$14_n$ each comprising a parity generator 16 and a request detector 17. Parity generator 16 receives a packet from the associated data terminal, derives parity bits from it according to the known error detecting algorithm and appends the parity bits and packet and cell location information to it before being applied to transmit data memory 12 and controller 13. The same packet is also applied to request detector 17 which determines whether the received packet contains a read request which indicates that the user is desiring to retrieve data from a receive data memory 21. If there is one, request detector 17 informs this fact to a read controller 25. Each packet contains a header in which a type field is provided for indicating whether the packet is an individual packet destined to a particular user terminal or a broadcast packet which is destined to all user terminals. The header further contains source and destination identifiers.

When a transmit request is received from one of the data terminals $5_1$-$5_n$, bus request controller 10 applies a request signal to bus 1 for requesting the right to use the bus. This request signal is received by bus arbiter 3 which provides arbitration among bus interfaces 2 if more than one transmit request is received and returns a grant signal to one of the contending interfaces to grant the right to use the bus. This grant signal is received by the bus request controller 10 and this fact is informed to transmit controller 12 to forward the packet stored in transmit data memory 12 onto the common bus 1.

All packets propagating along the bus 1 are stored into a receive buffer 20 of all bus interfaces 2 and checked for identification and errors. Received packets are sequentially written into the data memory 21 under control of a write controller 30 in a manner as will be described later. Simultaneously with the writing of a packet into memory 21, the contents of the packet are examined by an address detector 22 for identifying a source and a destination terminal, and further examined by a verifier 23 for bit errors which might occur during propagation along the bus system 1. Address detector 22 notifies the identifications of the source and destination terminals to a read controller 25. The output of verifier 23, indicating whether the received packet is verified or not, is applied to an ACK/NAK generator 24 as well as to the read controller 25. If the packet is verified, an ACK signal is forwarded onto bus 1, otherwise a NAK signal is returned to the source bus interface. A data selector 26 is connected to the output of memory 21. Packet data stored in data memory 21 are switched by selector 26 and applied through a bus 27 to a destination terminal interface 4 in response to a select signal from controller 25.

According to the present invention, a flag memory 28 and an address memory 29 are connected to the read controller 25. As shown in FIG. 3, the receive data memory 21 is partitioned into cells $A_1$-$A_m$. Flag memory 28 comprises an n×m matrix array of cells identified by intersecting columns $B_1$-$B_n$ and rows $C_1$-$C_m$. The columns of the flag memory 28 are associated respectively with user's data terminals $5_1$-$5_n$ to store packet data addressed to the respective user terminals, and the rows of the flag memory 28 are positionally associated with cells $A_1$-$A_m$ of data memory 21, respectively. In each cell of the flag memory 28 is stored a binary 1 or a binary 0. The binary 1 indicates that there is a message in the associated cell of the receive data memory 21 that is destined to the associated data terminal, the binary 0 indicating that the associated cell of data memory 21 is vacant and available for storage. Similar to flag memory 28, the address memory 29 has n×m cells which are identified by intersecting columns $D_1$-$D_n$ and rows $E_1$-$E_g$ (where g is smaller than m), with the columns $D_1$-$D_n$ corresponding respectively to the user terminals $5_1$-$5_n$. In an address-memory cell that is identified by column $D_i$ and row $E_j$ is stored the address data of a packet which is stored in cell $A_j$ of data memory 21 to be transmitted to user terminal $5_i$.

The operation of the read controller 25 will be described below with reference to the flowchart of FIG. 4.

The program execution starts with step 40 in which the controller is making a search through the flag memory 28 for a consecutive sequence of binary 0's which may exist along one or more of its rows and determines vacant data-memory cells for incoming packets. This availability information is supplied to write controller 30 to allow it to access the receive data memory 21 to store incoming packet data from buffer 20, while the header and cell location of the stored packet is supplied from the write controller 30 to the read controller 25. Control then proceeds to decision step 41 to check to see if an incoming packet that is addressed to one of the user terminals is detected by the address detector 41. If the answer is negative, control returns to the starting point of the program to continue the searching of the flag memory 28 and the exchanging of availability information with header information from the write controller 30. If the answer is affirmative, the program branches at step 41 to decision step 42 to check to see if the detected packet is verified or not. If it is, control branches at step 42 to decision step 43 to check to see if the incoming packet is individual or broadcast packet. If it is determined as being an individual packet, control branches at step 43 to step 44 to store a binary 1 into a cell of flag memory 28 that is located at the intersection of column $B_i$ and row $C_j$ (where subscript i indicates the destination terminal $5_i$, subscript j indicating that the packet is stored in cell $A_j$ of data memory 21). Control proceeds to step 45 to store address data into an address-memory cell at column $D_i$ and row $E_k$ to indicate the location of the packet in the data memory cell $A_j$ (where subscript k indicates the least row number of vacant cells of column $D_i$). If the packet is determined as being a broadcast packet, control branches at step 43 to step 46 to store binary 1's into all cells of row $C_j$ if the packet is a broadcast packet and control goes to step 47 to store the packet's address data into cells of columns $D_1$-$D_n$ and rows $E_{k1}$-$E_{kn}$ (where $k_1$-$k_n$ indicate least row numbers of vacant cells of columns $D_1$-$D_n$, respectively), thus completing write operations for the flag and address memories 28, 29 associated with the writing of packet data into memory 21.

The program now begins a read operation for the receive data memory 21 with step 48 by checking the output of each request detector 17 for a read request signal from data terminal $5_i$. If no read request is detected by any of the request detectors 17, control returns to step 40 to continue the above process for writing incoming packet data into the receive data memory 21. If a read request is detected, control branches at step 48 to step 49 to read address data from address memory 29 from a location specified by column $D_i$ and row $E_1$.

The packet data read out of the data memory 21 is then transmitted to the requesting data terminal $5_1$ (step 50). The program proceeds to decision step 51 to check for the presence of an ACK signal from the requesting data terminal. If there is none, the packet might have been lost or corrupted and control returns to step 49 to retransmit a copy of the packet, and if there is one, the program branches at step 51 to step 52 to shift all address data stored in column $D_i$ in the direction of columns by one row interval so that the address data previously stored in column $D_i$ and row $E_1$ is erased. Finally, control proceeds to step 53 to store a binary 0 into the flag memory 28 at column $B_i$ and row $C_j$.

Assume that incoming packets P1 and P2 destined to user terminals $5_1$ and $5_2$ are successively received before arrival of a broadcast packet BR1, followed by the reception of packets P3, P4, P5 destined respectively to user terminals $5_7$, $5_8$ and $5_{14}$ and a broadcast packet BR2 and the reception of packets P6, P7, P8, P9, P10 destined to user terminals $5_1$, $5_2$, $5_{14}$, $5_8$ and $5_7$, respectively (see FIGS. 3A, 3B and 3C).

During the time prior to the arrival of the first packet P1, all flag memory cells are assumed to be filled with binary zero's, and step 40 is repeatedly executed so that read controller 25 is informed by write controller 30 of the headers and cell locations of an arriving packets which may be stored into memory 21. When packet P1 is stored into memory 21, read controller 25 has been informed of the fact that packet P1 is stored in data-memory cell $A_1$ (step 40). When this packet is detected as being destined to the own interface by address detector 22 (step 41) and subsequently the validity of the packet is verified by verifier 23 (step 42), a binary 1 is stored into flag-memory cell at column $B_1$ and row $C_1$ (steps 43, 44) as shown in FIG. 3B and the address data of packet P1 is stored into the cell $(D_1, E_1)$ of address memory 29 (step 45) as shown in FIG. 3C. Similar events take place when packet P2 arrives so that a binary 1 is stored into flag-memory cell at column $B_2$ and row $C_2$, and the address data of the packet is stored into the cell $(D_2, E_2)$ of address memory 29. When broadcast packet BR1 is stored in data memory cell $A_3$, binary 1's are stored into all cells of row $C_3$ of the flag memory 28 (steps 43, 46) and the address data for packet BR1 is stored into cells $(D_1, E_2), (D_2, E_2), (D_3, E_1), \ldots (D_n, E_1)$ by executing step 47.

Therefore, arrivals of subsequent packets P3, P4, P5 cause a binary 1 to be stored into cells $(B_7, C_4)$, $(B_8, C_5)$ and $(B_{14}, C_6)$, and cause their address data to be respectively stored into cells $(D_7, E_2), (D_8, E_2), (D_{14}, E_2)$ of memory 29, and broadcast packet BR2 will cause binary 1's to be stored into all cells of row $C_7$ and its address data to be stored into cells $(D_1, E_3), (D_2, E_3), (D_3, E_2)$ $\ldots (D_6, E_2), (D_7, E_3), (D_8, E_3), (D_9, E_2) \ldots (D_{13}, E_2)$, $(D_{14}, E_3), (D_{15}, E_2) \ldots (D_n, E_2)$. Likewise, packets P6 through P10 will cause a binary 1 to be stored into cells $(B_1, C_8), (B_2, C_9), (B_{14}, C_{10}), (B_8, C_{11})$ and $(B_7, C_{12})$, and their address data to be stored into cells $(D_1, E_4), (D_2, E_4), (D_{14}, E_4), (D_8, E_4)$ and $(D_7, E_4)$.

Assume that user terminal $5_1$ issued a read request, it is detected by request detector 17 and this fact is communicated to read controller 25. Control now branches at step 48 to step 49 to read address data from cell at column $D_1$ and row $E_1$. Packet data P1 is thus read out of memory 21 and transmitted to user terminal $5_1$ (step 50). Following acknowledgement of the packet by user terminal $5_1$ (step 51), all address data stored in column $D_1$ for packets P1, BR1, BR2 and P6 are shifted by one row interval, erasing the address data for packet P1 (step 52). A binary 0 is subsequently stored into flag memory at column $B_1$ and row $C_1$. Thus, the flag memory cells of row $C_1$ become all zero's and this fact will be subsequently checked to allow packet data to be stored into data memory cell $A_1$, overwriting the previously stored packet data.

If the user terminal $5_1$ continuously issued read requests, address data stored in column $D_1$ will be accessed in sequence and broadcast packet data BR, BR2 and individual packet data P6 are read out of data-memory cells $A_3$, $A_7$ and $A_8$ and transmitted to the requesting user terminal.

As the number of incoming packet data increases, vacant cells occur at random locations of the data memory 21 and hence the arrangement of flag bits 1's for each user terminal does not represent the sequence of arrivals. However, the address data for each user terminal are stored in the order of arrivals. Thus, packet sequence integrity is secured.

What is claimed is:

1. A communication system for serving a plurality of groups of user terminals, comprising:
   a common bus for carrying packets;
   a plurality of bus interfaces connected to said common bus, said bus interfaces being associated respectively with said groups of user terminals, each of said bus interfaces forwarding a packet received from one of the user terminals of the associated group onto said common bus and receiving a packet therefrom, and comprising:
   a main memory;
   an auxillary memory;
   address detector means for detecting a packet destined to at least one of the user terminals of the associated group from packets stored in the data memory; and
   control means responsive to the determination by said address detector means for storing control data into said auxiliary memory in a location corresponding to a destination user terminal and corresponding to a location of said detected packet in said main memory, said control means being responsive to a request from said destination user terminal for fetching control data from the auxiliary memory and accessing a packet in the main memory according to the fetched control data, transmitting a copy of the accessed packet to said destination user terminal, updating said control data following the transmission of the copy, and storing a packet from said common bus into the main memory according to the updated control data.

2. A communication system for serving a plurality of groups of user terminals, comprising:
   a common bus for carrying packets;
   a plurality of bus interfaces connected to said common bus, said bus interfaces being associated respectively with said groups of user terminals, each of said bus interfaces forwarding a packet received from one of the user terminals of the associated group onto said common bus and receiving a packet therefrom, and comprising:
   a data memory having a plurality of cells;
   a flag memory having an array of cells arranged in columns corresponding respectively to the user terminals of the associated group and in rows corresponding respectively to the cells of the data memory;

an address memory having an array of cells arranged in columns and rows, the columns corresponding respectively to the user terminals of the associated group;

address detector means for detecting a packet destined to at least one of the user terminals of the associated group from packets stored in the data memory; and control means responsive to the determination by said address detector means for writing a flag bit into a cell of the flag memory corresponding to a destination user terminal and corresponding to a cell of the data memory in which the detected packet is stored and writing address data into a cell of the address memory corresponding to the destination user terminal, said control means being responsive to a request from the destination user terminal for fetching address data from a cell of the address memory corresponding to the destination user terminal, accessing a packet in the data memory according to the fetched address data, transmitting a copy of the accessed packet to said destination user terminal, erasing a said flag bit in a cell corresponding to the cell of the data memory in which said accessed packet is stored, and storing a packet from said common bus into a cell of the data memory corresponding to a row of said flag memory in which no flag bits are stored.

3. A communication system for serving a plurality of groups of user terminals, comprising:

a common bus for carrying packets each containing a first indication that the packet has a single destination or a second indication that the packet has a plurality of destinations;

a plurality of bus interfaces connected to said common bus, said bus interfaces being associated respectively with said groups of user terminals, each of said bus interfaces forwarding a packet received from one of the user terminals of the associated group onto said common bus and receiving a packet therefrom, and comprising:

a data memory having a plurality of cells;

a flag memory having an array of cells arranged in columns corresponding respectively to the user terminals of the associated group and in rows corresponding respectively to the cells of the data memory;

an address memory having an array of cells arranged in columns and rows, the columns corresponding respectively to the user terminals of the associated group;

address detector means for detecting a packet destined to at least one of the user terminals of the associated group from packets stored in the data memory; and control means responsive to the determination by said address detector means for determining if the detected packet contains the first or second indication and writing a flag bit into a cell of the flag memory corresponding to a destination user terminal and corresponding to a cell of the data memory in which the detected packet is stored and writing address data into a cell of the address memory corresponding to the destination user terminal if the packet is determined as having the first indication, or writing flag bits into cells of the flag memory corresponding to multiple destination user terminals and corresponding to a cell of the data memory in which the detected packet is stored and writing address data into cells of the address memory corrsponding to said multiple destination user terminals if the packet is determined as having the second indication, said control means being responsive to a request from a destination terminal for fetching address data from a cell of the address memory corresponding to the requesting destination terminal, accessing a packet in the data memory according to the fetched address data, transmitting a copy of the accessed packet to said requesting destination terminal, erasing a said flag bit in a cell corresponding to the cell of the data memory in which said accessed packet is stored, and storing a packet from said common bus into a cell of the data memory corresponding to a row of said flag memory in which no flag bits are stored.

* * * * *